(12) United States Patent
Henke et al.

(10) Patent No.: US 11,156,067 B2
(45) Date of Patent: Oct. 26, 2021

(54) DETONATION TRANSFER SYSTEM

(71) Applicant: Hunting Titan, Inc., Pampa, TX (US)

(72) Inventors: Joseph Albert Henke, Hallettsville, TX (US); Johnny Covalt, Burleson, TX (US)

(73) Assignee: Hunting Titan, Inc., Pampa, TX (US)

( * ) Notice: Subject to any disclaimer, the term of this patent is extended or adjusted under 35 U.S.C. 154(b) by 57 days.

(21) Appl. No.: 16/075,455

(22) PCT Filed: Feb. 10, 2017

(86) PCT No.: PCT/US2017/017487
§ 371 (c)(1),
(2) Date: Aug. 3, 2018

(87) PCT Pub. No.: WO2017/139656
PCT Pub. Date: Aug. 17, 2017

(65) Prior Publication Data
US 2019/0048693 A1  Feb. 14, 2019

Related U.S. Application Data

(60) Provisional application No. 62/296,433, filed on Feb. 17, 2016, provisional application No. 62/294,113, filed on Feb. 11, 2016.

(51) Int. Cl.
*E21B 43/1185* (2006.01)
*F42C 9/10* (2006.01)
(Continued)

(52) U.S. Cl.
CPC .... *E21B 43/1185* (2013.01); *E21B 43/11852* (2013.01); *E21B 43/11855* (2013.01);
(Continued)

(58) Field of Classification Search
CPC ............... E21B 43/116; E21B 43/1185; E21B 43/11852; E21B 43/11855; F42D 1/06; F42C 9/10
See application file for complete search history.

(56) References Cited

U.S. PATENT DOCUMENTS 4,266,613 A * 5/1981 Boop ........................ F42D 1/04
166/299
4,614,156 A   9/1986 Colle, Jr. et al.
(Continued)

FOREIGN PATENT DOCUMENTS

CA   3022857 A1 * 11/2017 ............. F41A 19/65
EP   0288238 A2   10/1988

OTHER PUBLICATIONS

Notification of international search report and written opinion of the international searching authority based on PCT/US2017/017487, dated Apr. 27, 2017, 12 pages.
(Continued)

*Primary Examiner* — Jennifer H Gay
(74) *Attorney, Agent, or Firm* — Christopher McKeon; Jason Saunders; Arnold & Saunders, LLP

(57) ABSTRACT

A gun to gun transfer delay fuse that includes a delay housing, a first cylindrical cavity housing a firing pin and igniter, and a second cylindrical cavity housing a delay fuse with a centralizer feature.

19 Claims, 3 Drawing Sheets

(51) Int. Cl.
*F42D 1/06* (2006.01)
*G01V 1/08* (2006.01)

(52) U.S. Cl.
CPC .................. *F42C 9/10* (2013.01); *F42D 1/06* (2013.01); *G01V 1/08* (2013.01)

(56) References Cited

U.S. PATENT DOCUMENTS

| | | | | |
|---|---|---|---|---|
| 4,862,964 A * | 9/1989 | George | ................ | E21B 34/102 166/297 |
| 4,969,525 A * | 11/1990 | George | ................ | E21B 43/116 102/319 |
| 5,070,943 A * | 12/1991 | Walker | ................ | E21B 43/116 166/297 |
| 5,078,210 A | 1/1992 | George | | |
| 5,237,136 A * | 8/1993 | Langston | .......... | E21B 43/11852 175/2 |
| 5,301,755 A * | 4/1994 | George | ............ | E21B 43/11852 166/297 |
| 5,483,895 A * | 1/1996 | Tomek | .............. | E21B 43/11852 102/251 |
| 5,490,563 A * | 2/1996 | Wesson | ................... | E21B 41/00 166/297 |
| 5,540,293 A * | 7/1996 | Mohaupt | .......... | E21B 43/11855 166/297 |
| 5,603,384 A * | 2/1997 | Bethel | ................ | E21B 43/11855 175/4.54 |
| 5,680,905 A * | 10/1997 | Green | ............... | E21B 43/11852 175/4.54 |
| 5,691,712 A | 11/1997 | Meek et al. | | |
| 5,890,539 A | 4/1999 | Huber et al. | | |
| 5,908,365 A * | 6/1999 | LaJaunie | .......... | E21B 43/11852 102/206 |
| 6,435,278 B1 * | 8/2002 | Barlow | ............ | E21B 43/11855 166/297 |
| 6,675,896 B2 * | 1/2004 | George | ................ | E21B 43/119 166/297 |
| 8,763,507 B2 * | 7/2014 | Ross | ................ | E21B 43/11852 89/1.15 |
| 9,080,433 B2 * | 7/2015 | Lanclos | ............. | E21B 43/1185 |
| 9,291,040 B1 * | 3/2016 | Hardesty | ................... | F42D 1/04 |
| 9,689,240 B2 * | 6/2017 | LaGrange | ......... | E21B 43/11852 |
| 2003/0062153 A1 * | 4/2003 | Broad | ............... | E21B 43/11852 166/55.1 |
| 2003/0196806 A1 * | 10/2003 | Hromas | .................. | E21B 17/06 166/297 |
| 2010/0000789 A1 * | 1/2010 | Barton | ............. | E21B 43/11852 175/2 |
| 2012/0018157 A1 * | 1/2012 | Gill | ....................... | E21B 43/116 166/297 |
| 2013/0014990 A1 * | 1/2013 | Barton | ............. | E21B 43/11852 175/2 |
| 2013/0277108 A1 * | 10/2013 | Greeley | .................... | C06C 5/06 175/2 |
| 2014/0083718 A1 * | 3/2014 | Bell | .................... | E21B 43/1185 166/378 |
| 2014/0318766 A1 * | 10/2014 | Bishop | .................... | E21B 29/00 166/250.01 |
| 2015/0027302 A1 * | 1/2015 | Wall | ................. | E21B 43/11852 89/1.15 |
| 2015/0041135 A1 * | 2/2015 | Coffey | ............. | E21B 43/11852 166/297 |
| 2015/0176374 A1 * | 6/2015 | LaGrange | ......... | E21B 43/11852 166/297 |
| 2015/0376993 A1 * | 12/2015 | Vass | ...................... | E21B 43/116 175/4.56 |
| 2016/0202033 A1 * | 7/2016 | Shahinpour | ............. | E21B 43/11 102/206 |
| 2017/0211363 A1 * | 7/2017 | Bradley | .................... | F42B 3/08 |
| 2019/0048693 A1 * | 2/2019 | Henke | ................ | E21B 43/1185 |
| 2019/0145216 A1 * | 5/2019 | Shampine | ............. | E21B 33/068 |

OTHER PUBLICATIONS

T. Lagrange, et al., "Coiled-Tubing-Conveyed Perforating in Shale", SPE 143354, Apr. 5, 2011, XP055605936, DOI: 10.2118/143354-MS, ISBN: 978-1-55563-342-4, 14 pages.
Supplementary European Search Report, European application No. EP17750881, dated Aug. 1, 2019, 9 pages.
Supplementary European Search Report, European application No. EP19162205, dated Aug. 21, 2019, 6 pages.
Office action dated May 23, 2019, Canadian application No. 3,014,081, 3 pages.

* cited by examiner

DETONATION TRANSFER SYSTEM

RELATED APPLICATIONS

This application claims priority to U.S. Provisional Application No. 62/294,113, filed on Feb. 11, 2016 and U.S. Provisional Application No. 62/296,433, filed on Feb. 17, 2016.

BACKGROUND OF THE INVENTION

Generally, when completing a subterranean well for the production of fluids, minerals, or gases from underground reservoirs, several types of tubulars are placed downhole as part of the drilling, exploration, and completions process. These tubulars can include casing, tubing, pipes, liners, and devices conveyed downhole by tubulars of various types. Each well is unique, so combinations of different tubulars may be lowered into a well for a multitude of purposes.

A subsurface or subterranean well transits one or more formations. The formation is a body of rock or strata that contains one or more compositions. The formation is treated as a continuous body. Within the formation hydrocarbon deposits may exist. Typically a wellbore will be drilled from a surface location, placing a hole into a formation of interest. Completion equipment will be put into place, including casing, tubing, and other downhole equipment as needed. Perforating the casing and the formation with a perforating gun is a well known method in the art for accessing hydrocarbon deposits within a formation from a wellbore.

Explosively perforating the formation using a shaped charge is a widely known method for completing an oil well. A shaped charge is a term of art for a device that when detonated generates a focused explosive output. This is achieved in part by the geometry of the explosive in conjunction with an adjacent liner. Generally, a shaped charge includes a metal case that contains an explosive material with a concave shape, which has a thin metal liner on the inner surface. Many materials are used for the liner; some of the more common metals include brass, copper, tungsten, and lead. When the explosive detonates the liner metal is compressed into a super-heated, super pressurized jet that can penetrate metal, concrete, and rock.

A perforating gun has a gun body. The gun body typically is composed of metal and is cylindrical in shape. Within a typical gun tube is a charge holder or carrier tube, which is a tube that is designed to hold the actual shaped charges. The charge holder will contain cutouts called charge holes where the shaped charges will be placed.

A shaped charge is typically detonated by a booster or igniter. Shaped charges may be detonated by electrical igniters, pressure activated igniters, or detonating cord. One way to ignite several shaped charges is to connect a common detonating cord that is placed proximate to the igniter of each shaped charge. The detonating cord is comprised of material that explodes upon ignition. The energy of the exploding detonating cord can ignite shaped charges that are properly placed proximate to the detonating cord. Often a series of shaped charges may be daisy chained together using detonating cord.

A firing head is used to detonate the detonating cord in the perforating gun. The firing head may be activated by an electrical signal. Electricity may be provided by a wireline that ties into the cablehead at the top of a tool string. The electrical signal may have to travel through several components, subs, and tools before it gets to the firing head. A reliable electrical connector is needed to ensure the electrical signal can easily pass from one component to the next as it moves down the tool string. The electrical signal is typically grounded against the tool string casing. As a result, the electrical connections must be insulated from tool components that are in electrical contact with the tool string casing.

SUMMARY OF EXAMPLE EMBODIMENTS

An example embodiment may include an apparatus for use in a downhole tool including a cylindrical housing having a common axis, a first cylindrical portion with a first distal end, a first outer surface, and a first diameter, a second cylindrical portion with a second distal end, a second outer surface, and a second diameter, a third portion, located between and integral with the first cylindrical portion and the second cylindrical portion whereby the first cylindrical portion, the second cylindrical portion, and the third cylindrical portion are axially aligned about the common axis, with a third outer surface and a third diameter, a first cylindrical cavity located within and axially aligned with the first cylindrical portion, a second cylindrical cavity located within and axially aligned with the second cylindrical portion, in the example the first cylindrical cavity may be adapted to house a firing pin assembly and a percussion initiator, the second cylindrical cavity may be adapted to house a delay fuse.

A variation of the example embodiment may include the third cylindrical portion's third diameter being larger than the first cylindrical portion's first diameter or the second cylindrical portion's second diameter. It may include the first cylindrical portion having first outer threads located on the first outer surface. It may include the first outer threads being adapted to interface with threads on a distal end of a perforating gun. It may include the second cylindrical portion having second outer threads located on the second outer surface. It may include the second outer threads being adapted to interface with threads on a distal end of a perforating gun. The delay fuse may be a six minute delay fuse. It may include an axial through hole that puts the first cylindrical cavity in explosive communication with the second cylindrical cavity. The cylindrical housing may have a box thread or a pin thread on the first portion. The cylindrical housing may have a box thread or a pin thread on the second portion. The second cylindrical cavity may have a frusto-conical feature that centralizes the delay fuse in the second cavity. The second cylindrical cavity may have a frusto-conical feature that guides the delay fuse into place within the second cavity.

An example embodiment may include an apparatus for use in a downhole tool including a single piece cylindrical housing having a common axis, a first end, a second end, and a housing length and a housing diameter, a first bore of a first diameter extending a first length along the common axis from the first end into the housing and having a flat bottom, a second bore of a second diameter extending a second length along the common axis from the second end into the housing and having a frusto conical bottom end, a third bore of a third diameter extending a third length along the common axis from the second end into the housing and having a flat bottom, a fourth bore of a fourth diameter extending a fourth length along the common axis from the first end into the housing and having a flat bottom, a fifth bore of a fifth diameter extending a fifth length along the common axis from the first end into the housing and having a flat bottom, a thru hole along the common axis from the flat bottom of the third bore to the flat bottom of the first bore.

A variation of the example embodiment may include the housing length being more than the first length and the third length combined. The third length may be longer than the second length. The third diameter may be less than the second diameter. The fourth diameter may be greater than the first diameter. The fourth length may be less than the first length. The fifth diameter may be greater than the first diameter. The fifth diameter may be greater than the fourth diameter. The fifth length may be less than the first length. The fifth length may be less than the fourth length.

A further variation of the example embodiment may include a pin thread on the first end. It could also include a pin thread on the second end. It could instead include a box thread on the first end. It could instead include a box thread on the second end. The first bore may be sized to accept an igniter installed at the bottom end of the first bore. The second bore may be sized to accept an end fitting of a perforating gun. The third bore may be sized to accept a delay fuse installed at the bottom end of the third bore. The fourth bore may be sized to accept a firing pin installed at the bottom end of the fourth bore. The fifth bore may be sized to accept the end fitting of a perforating gun. The frusto-conical shape may be formed by the angle of a drill bit.

An example embodiment may include a system for perforating a wellbore that includes a gun string conveyed downhole on tubing with a distal end. The gun string may include a firing head with a first end coupled to the distal of the tubing and a second end having a top sub with a first end coupled to the second end of the firing head and a second end, a first perforating gun with a first end coupled to the top sub and a second end, a first delay housing further comprising a single piece cylindrical housing having a common axis, a first end, a second end, and a housing length and a housing diameter, a first bore of a first diameter extending a first length along the common axis from the first end into the housing and having a flat bottom, a second bore of a second diameter extending a second length along the common axis from the second end into the housing and having a drill point bottom, a third bore of a third diameter extending a third length along the common axis from the second end into the housing and having a flat bottom, a thru hole along the common axis from the flat bottom of the third bore to the flat bottom of the first bore, in which the first end of the first delay housing is coupled to the second end of the first perforating gun and a second end. The example also may include a second perforating gun with a first end and a second end, in which the first end of the second perforating gun is coupled to the second end of the delay housing.

A variation of the example embodiment may include a second delay housing with a first end coupled to the second end of the second perforating gun. It may include a third perforating gun with a first end coupled to the second delay housing and a second end. It may include a bull plug coupled to the second end of the second perforating gun. It may include a bull plug coupled to the second end of the third perforating gun. The firing head may be activated by a ball pumped down the tubing. The second end of the firing head may contain a firing pin and a percussion initiator. The top sub may include a primer cord located therethrough with a first booster crimped on the end of the primer cord at the first end and a second booster crimped on the end of the primer cord at the second end. The first perforating gun may include one or more shaped charges. The first delay housing may include a firing pin, an initiator, and a delay fuse. The example may include a fuse retainer end fitting coupled between the first delay fuse located between the delay housing and the first end of the second perforating gun. The second perforating gun may include one or more shaped charges. The second delay housing may include a firing pin, an initiator, and a delay fuse. A fuse retainer end fitting may be coupled between the delay fuse located between the second delay housing and the first end of the third perforating gun. The third perforating gun may have one or more shaped charges. A first cylindrical end fitting may be located coaxially between the second end of the first perforating gun and the first end of the first delay housing. A second cylindrical end fitting may be located coaxially between the second end of the second perforating gun and the first end of the second delay housing. The delay housing may have a fourth bore of a fourth diameter extending a fourth length along the common axis from the first end into the housing and having a flat bottom. The delay housing may have a fifth bore of a fifth diameter extending a fifth length along the common axis from the first end into the housing and having a flat bottom. The first delay housing may have a pin thread or a box thread on the first end. The first delay housing may have a pin thread or box thread on the second end.

BRIEF DESCRIPTION OF THE DRAWINGS

For a thorough understanding of the present invention, reference is made to the following detailed description of the preferred embodiments, taken in conjunction with the accompanying drawings in which reference numbers designate like or similar elements throughout the several figures of the drawing. Briefly.

DETAILED DESCRIPTION OF EXAMPLES OF THE INVENTION

In the following description, certain terms have been used for brevity, clarity, and examples. No unnecessary limitations are to be implied therefrom and such terms are used for descriptive purposes only and are intended to be broadly construed. The different apparatus, systems and method steps described herein may be used alone or in combination with other apparatus, systems and method steps. It is to be expected that various equivalents, alternatives, and modifications are possible within the scope of the appended claims.

Figure 1:
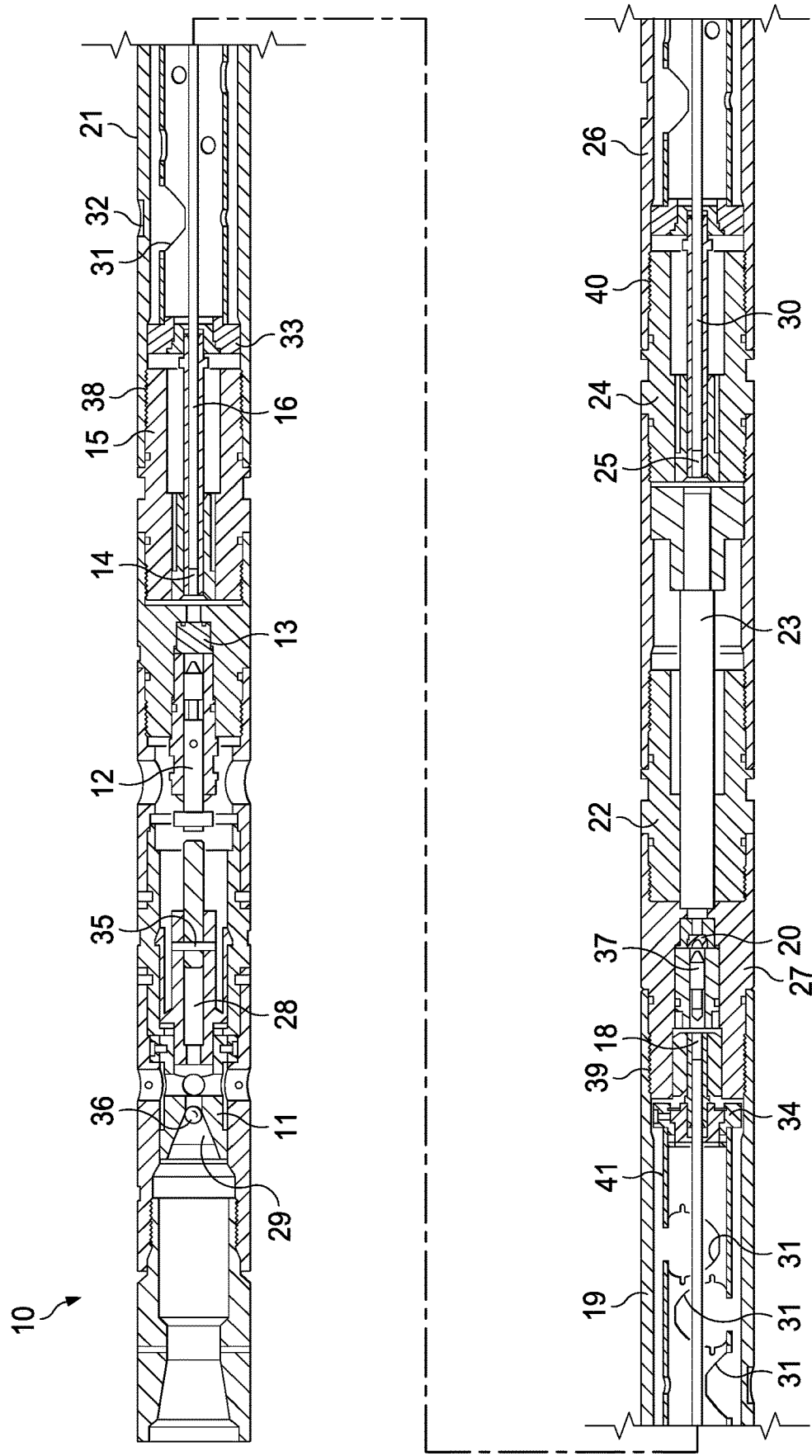
FIG. 1 shows a side view of a gun-to-gun delay system.

An example embodiment is shown in FIG. 1 depicting a perforating gun assembly 10. The perforating gun assembly 10 may be conveyed on tubing. This type of perforating tool is referred to as TCP or Tubing Conveyed Perforating. However, perforating guns may be used with wireline or other known methods to transport perforating guns downhole. The assembly 10 has a ball-drop firing head 11 that contains a direct impact rod 12 and a percussion initiator 13. A sub 15 connects the firing head with a perforating gun 26. A booster 14 is located in the sub 15. A primer cord 16 is connected to the booster 14 and travels through the perforating gun 21, connecting to any perforating charges (not shown) located within the gun body 19. The booster 14 is typically crimped to the primer cord 16. The primer cord 16 then terminates in sub 27 and has a booster 18 crimped to the end. An igniter 20 and firing pin 37 are located within sub 27. Sub 22 has a delay fuse 23 located proximate to the igniter in the sub 27 and terminating against the booster 25 in sub 24. Sub 24 connects to perforating gun 26 via its box end 40. In this example the gun body 19 has box end 38 at the upper end and a box end 39 on the lower end. Box end in this example includes having internal female threads. The gun body 19 also has scallops 32, which are portions of the body that are machined flat to aid in controlling the explosive energy released from detonating shaped charges. The perforating gun 21 has a charge tube 41 that includes a plurality of shaped charge cutouts 31 that shaped charges may be installed into. The plurality of shaped charges can be in any number and at any phase angle.

The example shown in FIG. 1 depicts a gun to gun transfer system using a 6 minute delay between guns. The delay fuse 23 can be any length of time desired. A ball is pumped down the tubing until it seats on the ball seat 29 of the actuating piston 28 in the firing head 11. When the ball is seated properly it creates a pressure seal, allowing pressure to build and actuate the firing head 11. The actuation of the firing head 11 drives the piston 28 into the direct impact rod 12. The rod 12 then strikes the percussion initiator 13, which then proceeds to ignite and detonate the booster 14. The primer cord 16 is detonated by the booster 14, causing an explosion to travel the length of the primer cord 16, detonating any adjacent shaped charges in the perforating gun 26. Once the reaction reaches the end of the primer cord 16 it detonates another booster 18. Booster 18 will detonate with enough force to shear a flange and slam the firing pin 19 into the percussion style explosive igniter 20 that will then start the 6 minute delay fuse 23. Once the delay fuse has burned completely it will produce a high energy detonation to ignite booster 25, thus continuing the perforation sequence in perforating gun 26. These delay fuses and perforating guns can be linked together in a variety of combinations to allow a set of perforating guns to fire, then the operator can move the gun string a desired distance, and then the next perforating will fire. This process can be repeated for any number of perforating guns and delay fuses. Once the firing head is activated the firing of the perforating guns will continue until all perforating guns have discharged.

Figure 2:
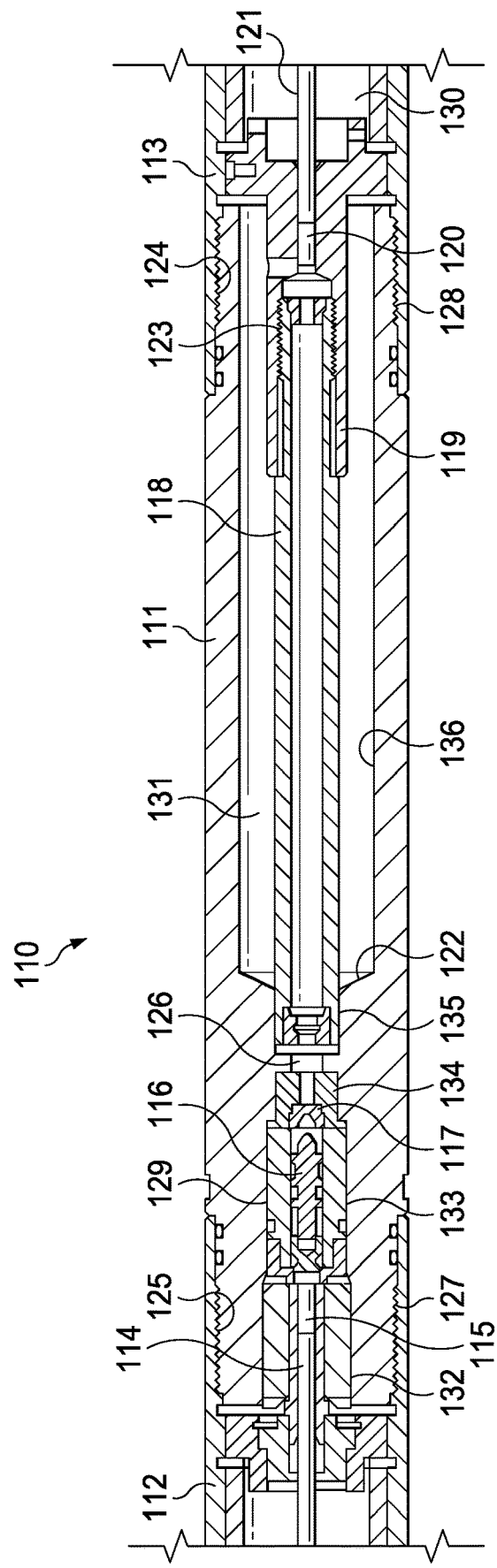
FIG. 2 shows a side view of a single housing gun-to-gun transfer with delay.

The example shown in FIG. 2 depicts a gun to gun transfer system 110 using a 6 minute delay fuse assembly 111. The delay fuse assembly 111 is coupled to a first perforating gun 112 and a second perforating gun 113. The first perforating gun 112 has a primer cord 114 with a booster 115 crimped to the end. The delay fuse assembly 111 has a firing pin assembly 116 that the booster 115 can activate with explosive energy. The firing pin assembly 116 is connected to a percussion initiator 117; both are located within the cavity 129. The percussion initiator 117 can ignite the delay fuse 118; in this case a 6 minute delay fuse is shown however any length of delay is possible. The delay fuse 118 is located in cavity 131 and terminates into a fuse retainer end fitting 119 that includes a booster 120. The booster 120 is crimped onto a primer cord 121 that travels through the perforating gun 113. The perforating gun 112 has a box end 125 that couples to the first pin end 127 of the delay fuse assembly 111. The delay fuse assembly 111 has a second pin end 128 that couples into the box end 124 of perforating gun 113. The box end has female threads while the pin end has male threads. The delay fuse assembly 111 can have pin threads or box threads on either end, depending on the end of the perforating gun the delay needs to couple with. Cavity 131 has a frusto-conical guide 122 that aids in the installation of the delay fuse 118 into cavity 131. The delay fuse assembly 111 has a first cavity 129 and a second cavity 131. The first cavity 129 and the second cavity 131 are joined by thru hole 126, explosively coupling first cavity 129 with second cavity 131.

The first cavity 129 is made up of a series of bores 132, 133, and 134 of progressively smaller diameter. Second cavity 131 is made up of bore 135 and bore 136, where bore 136 has a frusto-conical guide 122 connecting it with the smaller bore 135. Bore 135 is sized to slideably engage with the delay fuse 118. Bore 134 is sized to contain the percussion igniter 117. Bore 133 is sized to contain the firing pin assembly 116. Bore 132 is sized to engage the end fitting of perforating gun 112. The delay fuse 118 is coupled to the threads in the fuse retainer end fitting 119 and is slideably engaged with the bore 135 of the delay fuse assembly 111.

The operation of the gun to gun transfer system 110 shown in FIG. 2 works by transferring explosive energy from the first perforating gun 112 to the second perforating gun 113 in 6 minutes instead of instantaneously. The advantage for delaying the transfer of explosive energy is that a perforating gun string can be repositioned between the firing of each perforating gun. Another advantage to putting delay fuses in between guns is that it allows the operator to count each gun that explodes from the surface. When all the perforating guns in a string explode at once it is impossible to know whether every gun has fired or not. For a variety of reasons, an operator does not want to bring an armed, unfired perforating gun out of the hole.

The detonation of the primer cord 114 causes the detonation of the booster 115. The detonation of the booster 115 causes the firing pin assembly 116 to activate percussion initiator 117. Percussion initiator 117 starts the delay fuse 118. The delay fuse 118 will burn from one end to the other in a set predetermined amount of time. The termination of the delay fuse 118 will ignite booster 120. The ignition of booster 120 will then cause the primer cord 121 to explode, thus transferring explosive energy from the first gun 112 to the second gun 113.

Still referring to FIG. 2, the assembly of the delay fuse requires first making up the perforating gun 113 with its explosives, primer cord, and booster installed via a charge tube 130. The end fitting 119 is connected to the charge tube 130. With the end fitting 119 installed in perforating gun 113, the delay fuse 118 can be installed, in this case via threads 123, onto the distal end of end fitting 119. Once the delay fuse 118 is threaded into place, the delay fuse assembly 111, with the firing pin 116 and percussion initiator 117 already installed, slides over the delay fuse 118 and then threads into the perforating gun 113 via box end 124 and pin end 128. The frusto-conical guide 122 ensures that the delay fuse 118 properly locates itself within cavity 131 as the delay fuse assembly 111 is coupled to the perforating gun 113. The frusto-conical guide 122 is a frusto conical shaped drill point that acts as a guiding mechanism when installing the delay fuse assembly 111 with the delay fuse 118. Frusto-conical guide 122 is an example of a means for centralizing the delay fuse 118 during installation. Then a perforating gun 112 is secured to the delay fuse assembly 111 via box end 125 and pin end 127. The assembly of the gun string is the opposite of the firing order as the lowest components are made up and then coupled to the higher, or uphole, components to make a gun string.

Figure 3:
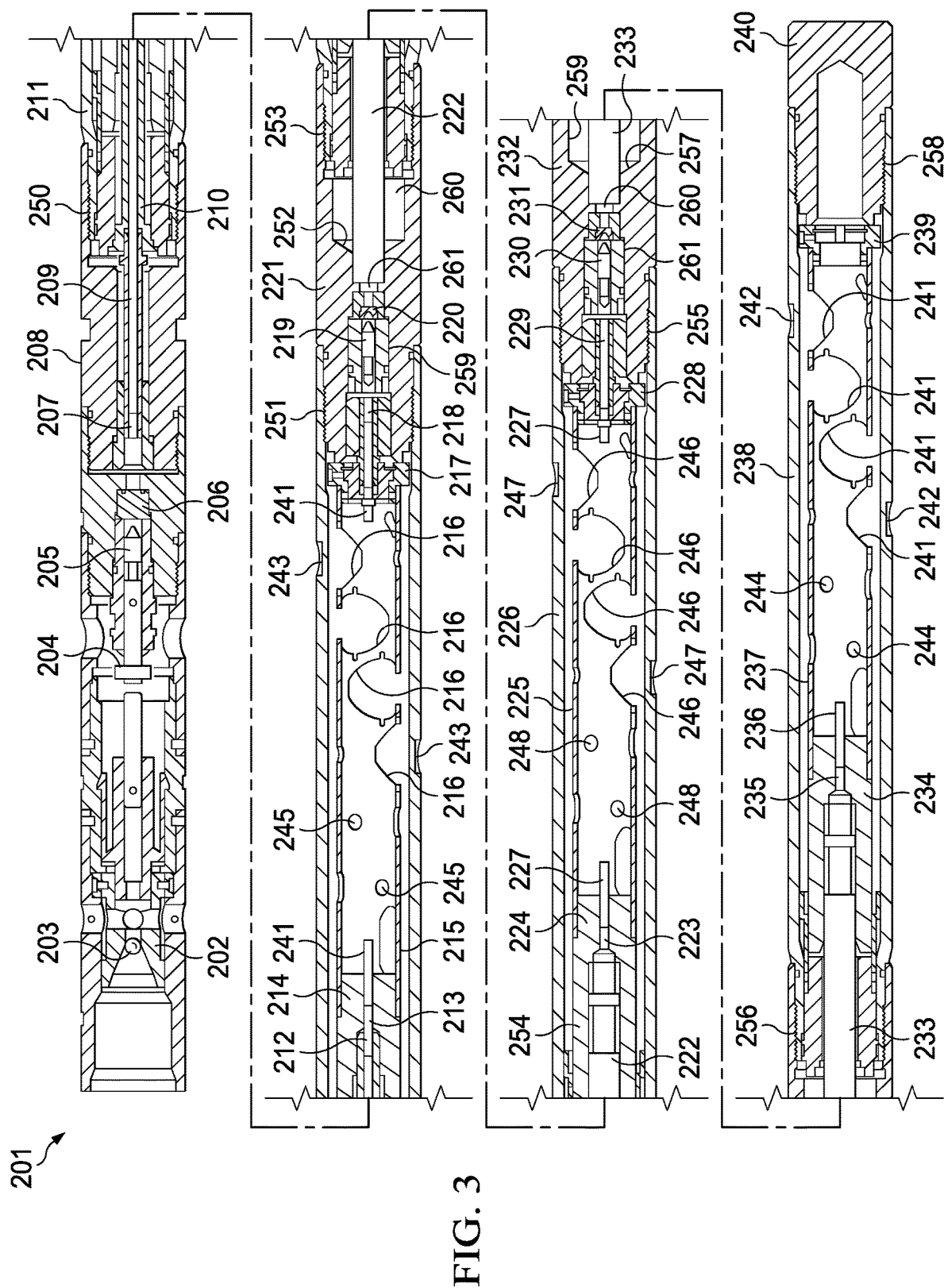
FIG. 3 shows a side view of a perforating gun string with multiple gun-to-gun transfer delay fuses and multiple perforating guns.

Another example embodiment is shown in FIG. 3 with of a gun delay system 201. The system includes a ball drop firing head 202 that accepts a ball 203 pumped down from the surface. The firing head 202 at a predetermined pressure activates the direct impact rod 204, which then forces a firing pin 205 into a percussion initiator 206. The percussion initiator 206 detonates a booster 207 crimped on the first end of the primer cord 209. The second end of primer cord 209 has a booster 212. The primer cord 209 travels through top sub 208, into the transfer insert 210, and terminates within the delay holder end fitting 214. Booster 212 is adjacent to booster 213. The detonation of booster 212 will in turn detonate booster 213. Booster 213 is crimped on the first end of primer cord 241. Primer cord 241 travels through the first perforating gun 211 and around charge tube 215. Charge tube 215 has a plurality of shaped charge cutouts 216 and associated holes 245 for holding a predetermined number of shaped charges in a desired orientation. Perforating gun 211 has a pin end 250 and a box end 251. Perforating gun 211 has a scallop 243 located adjacent to each shaped charge cutout 216.

Primer cord 241 travels through end fitting 217 has a booster 218 crimped on the second end. Booster 218 is located adjacent to the firing pin 219 in the delay housing 221. Delay housing 221 has a first end that is a pin end that couples to box end 251 on perforating gun 211. Delay housing 221 has a second end that is a box end and couples to pin end 253 of perforating gun 226. Firing pin 219, when activated by booster 218, strikes the igniter 220, setting off the delay fuse 222. The delay fuse 222 burns for a predetermined period of time, in this example six minutes is typical, and will activate booster 223 located in the end fitting 224 at the predetermined period of time. The detonation of booster 223, which is crimped on primer cord 227, causes a second perforating gun 226 to detonate. The delay fuse 222 is located in cavity 260, which terminates in a drill point 252. The drill point 252 centralizes the delay fuse 222 during installation. Through hole 261 links the cavity 259, containing the firing pin 219 and igniter 220, with the cavity 260 containing the delay fuse 222. The delay fuse 222 is threaded onto the end fitting 254, which is attached to perforating gun 226 and the delay fuse housing 221 slides into place over the delay fuse 222. Charge tube 225 has a plurality of shaped charge cutouts 246 and holes 248 for holding and orienting shaped charges. The perforating gun has scallops 247 aligned with each shaped charge. A bull plug 240 is coupled to the box end 258.

Still referring to FIG. 3, the detonation of booster 223 causes primer cord 227 to detonate. The detonation of primer cord 227 will detonate all of the shaped charges located in charge tube 225. The primer cord 227 then detonates booster 229 crimped on its second end. End fitting 228 is attached to the charge tube 225. The detonation of booster 229 causes the firing pin 230 to strike the igniter 231, thereby igniting a second delay fuse 233 located within in the delay housing 232. This second delay fuse 233 is set to burn for a predetermined amount of time. Delay housing 232 has a first cavity 261 for holding the firing pin 230 and the igniter 231. Delay housing 232 has a second cavity 259 for holding the delay fuse 233. The through hole 260 explosively couples the first cavity 261 with the second cavity 259. Once the second delay fuse 233 burns up it will detonate booster 235 located in end fitting 234 and crimped onto the first end of primer cord 236. The detonation of primer cord 236 will detonate a third perforating gun 238 by detonating all of the shaped charges located in charge tube 237. Charge tube 237 is secured with end fitting 239. End fitting 239 is coupled to the delay fuse 233. Delay housing 232 contains a drill point 257 for centralizing the delay fuse 233. Perforating gun 226 has pin end 253 and box end 255. Perforating gun 238 has pin end 256 and box end 258. A bull plug is located at the end of the gun string. The perforating gun 238 has charge tube 237 that contains shaped charge cutouts 241 and holes 244 for holding shaped charges. The perforating gun 238 also has scallops 242 aligned with each shaped charge.

Although the invention has been described in terms of particular embodiments which are set forth in detail, it should be understood that this is by illustration only and that the invention is not necessarily limited thereto. For example, terms such as upper and lower can be substituted with uphole and downhole, respectfully. Top and bottom could be left and right. The alternative embodiments and operating techniques will become apparent to those of ordinary skill in the art in view of the present disclosure. Accordingly, modifications of the invention are contemplated which may be made without departing from the spirit of the claimed invention.

What is claimed is:

1. An apparatus for use downhole comprising:
a cylindrical housing having:
a common axis;
a first cylindrical portion with a first distal end having a pin thread, a first outer surface, and a first diameter;
a firing pin assembly and a percussion initiator located within the first cylindrical portion;
a second cylindrical portion with a second distal end having a box thread, a second outer surface, a frusto-conical centralizer, and a second diameter;
a delay fuse located within the second cylindrical portion and retained axially via the frusto-conical centralizer;
a third portion, located between and integral with the first cylindrical portion and the second cylindrical portion whereby the first cylindrical portion, the second cylindrical portion, and the third cylindrical portion are axially aligned about the common axis, and having a third outer surface and a third diameter;
a first cylindrical cavity located within and axially aligned with the first cylindrical portion;
a second cylindrical cavity located within and axially aligned with the second cylindrical portion;
wherein the cylindrical housing is coupled to a first perforating gun at the first distal end on the first cylindrical portion and is coupled to a second perforating gun at the second distal end on the second cylindrical portion.

2. The apparatus of claim 1 wherein the delay fuse is a six minute delay fuse.

3. The apparatus of claim 1 further comprising an axial through hole in the third cylindrical portion, wherein the axial through hole provides explosive communication between the first cylindrical cavity and the second cylindrical cavity.

4. The apparatus of claim 1 further comprising a means for centralizing a delay fuse in the second cavity.

5. An apparatus for use downhole comprising:
a single piece cylindrical housing having a common axis, a first end having pin threads adapted for coupling to a first perforating gun, a second end having box threads adapted for coupling to a second perforating gun, a housing length and a housing diameter, further comprising:
a first bore of a first diameter extending a first length along the common axis from the first end into the housing and having a flat bottom;
a second bore of a second diameter extending a second length along the common axis from the second end into the housing and having a frusto-conical end within the cylindrical housing;

a third bore of a third diameter extending a third length along the common axis from the frusto-conical end of the second bore into the housing and having a flat bottom adapted for containing and centralizing a delay fuse;

a fourth bore of a fourth diameter extending a fourth length along the common axis from the flat bottom of the first bore into the housing and having a flat bottom;

a fifth bore of a fifth diameter extending a fifth length along the common axis from the flat bottom of the fourth bore into the housing and having a flat bottom; and a thru hole along the common axis from the flat bottom of the third bore to the flat bottom of the first bore.

6. The apparatus of claim 5, wherein the first bore is sized to accept a percussion igniter installed at the bottom end of the first bore.

7. The apparatus of claim 5, wherein the second bore is sized to accept an end fitting of a perforating gun.

8. The apparatus of claim 5, wherein the third bore is sized to accept a delay fuse installed at the bottom end of the third bore.

9. The apparatus of claim 5, wherein the fourth bore is sized to accept a firing pin installed at the bottom end of the fourth bore.

10. The apparatus of claim 5, wherein the fifth bore is sized to accept the end fitting of the first perforating gun.

11. The apparatus of claim 5, wherein the frusto-conical shaped is formed by the angle of a drill bit.

12. A system for perforating a wellbore comprising:
a string conveyed downhole on tubing with a distal end, further comprising:
a firing head with a first end coupled to the distal end of the tubing and a second end having a top sub, the top sub having a first end coupled to the second end of the firing head and a second end;
a first perforating gun with a first end coupled to the top sub and a second end;
a first delay housing further comprising a single piece cylindrical housing having a common axis, a first end having pin threads, a second end having box threads, and a housing length and a housing diameter, a first bore of a first diameter extending a first length along the common axis from the first end into the housing and having a flat bottom, a second bore of a second diameter extending a second length along the common axis from the second end into the housing and having a drill point bottom, a third bore of a third diameter extending a third length along the common axis from the drill point bottom of the second bore into the housing and having a flat bottom, a thru hole along the common axis from the flat bottom of the third bore to the flat bottom of the first bore, wherein the first end of the first delay housing is coupled to the second end of the first perforating gun, wherein the first delay housing further comprises a firing pin located in a fourth bore, a percussion igniter in the first bore, and a delay fuse slideably engaged in the third bore, and a second perforating gun with a first end and a second end, wherein the first end of the second perforating gun is coupled to the second end of the delay housing.

13. The system of claim 12 further comprising a second delay housing with a first end coupled to the second end of the second perforating gun.

14. The system of claim 12 further comprising a bull plug coupled to the second end of the second perforating gun.

15. The system of claim 12 wherein the firing head is activated by a ball pumped down the tubing.

16. The system of claim 12 wherein the second end of the firing head contains a firing pin and a percussion initiator.

17. The system of claim 12 wherein the top sub further comprises a primer cord located therethrough with a first booster crimped on the end of the primer cord at the first end.

18. The system of claim 12 further comprising a fuse retainer end fitting coupled between the first delay fuse located between the delay housing and the first end of the second perforating gun.

19. The system of claim 12 further comprising a first cylindrical end fitting located coaxially between the second end of the first perforating gun and the first end of the first delay housing.

* * * * *